J. SINGER.

CAR-COUPLING.

No. 6,752. Reissued Nov. 16, 1875.

Witnesses:

Otis F. Pushing

C. A. Cooper.

Jacob Singer

By his atty

Charles E. Foster

N. PETERS, PHOTO-LITHOGRAPHER, WASHINGTON, D. C.

UNITED STATES PATENT OFFICE.

JACOB SINGER, OF HARRISBURG, PENNSYLVANIA, ASSIGNOR OF ONE-HALF INTEREST TO ROBERT L. MUENCH, OF SAME PLACE.

IMPROVEMENT IN CAR-COUPLINGS.

Specification forming part of Letters Patent No. 151,724, dated June 9, 1874; reissue No. 6,752, dated November 16, 1875; application filed November 5, 1875.

*To all whom it may concern:*

Be it known that I, JACOB SINGER, of Harrisburg, county of Dauphin, State of Pennsylvania, have invented Improvements in Car-Couplings, of which the following is a specification:

The object of my invention is a car-coupling in which a link retained in a horizontal position in one draw-head will couple automatically when thrust into an opposite draw-head, the link resisting the back-thrust in coupling, but passing into the draw-head upon the application of greater pressure; and this I accomplish by combining with the head a block or follower, which falls by its gravity to a position beneath the coupling-pin, bears against and retains the link in a horizontal position when the pin has dropped, but yields, rising upon an inclined bearing, and permits the further inward movement of the link when excessive pressure is brought upon the latter.

Figure 1:
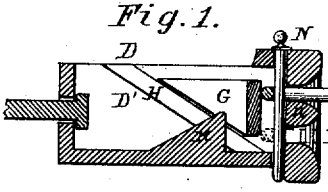
Figure 2:
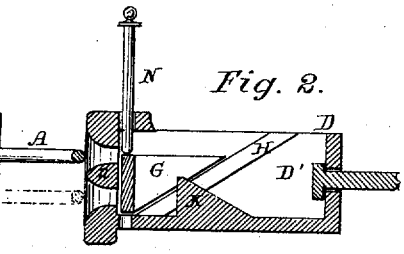
Figure 3:
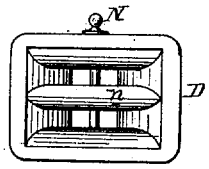
Figure 4:
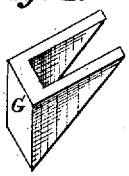

In the accompanying drawing, Figure 1 is a sectional elevation of one form of draw-head to which my improvement may be applied, showing the link retained in a horizontal position; Fig. 2, a sectional elevation of the draw-head, showing the pin retained in an elevated position; Fig. 3, an end view of Fig. 1, and Fig. 4 a detached perspective view.

Any of the ordinary draw-heads may be employed in carrying out my invention, which is illustrated in the drawing in connection with draw-heads D D, the flaring front of each of which is divided by a transverse bar, *n*, in the usual manner, to form two mouths for the reception of the links, to facilitate coupling when adjacent cars are of different heights. To an inclined bearing, H, within the chamber D′ of each draw-head, is adapted a block or follower, G, which, when not acted upon by a link, is maintained by its gravity in a forward position beneath the end of the usual pin N, thereby retaining the latter in the elevated position shown in Fig. 2.

Prior to coupling, the pin N of each draw-head is raised, when the block or follower will descend by its gravity to a position beneath the pin, retaining the latter in its elevated position. A link, A, is then thrust into one of the draw-heads until it pushes the block from beneath the pin, when the latter will fall, passing through and securing the link, against which the block will continue to bear, holding it in a horizontal position, as shown in Fig. 1.

It will be seen that this result is effected when the link is inserted in either mouth of the draw-head, and that it will be the same in a draw-head having a single mouth.

Thus retained, the link is in a position for coupling with the opposite draw-head, in entering which it strikes the follower, thrusting it back until the pin N falls and effects the coupling.

The pressure of the block G is sufficient to retain the link in its horizontal position, and to prevent the link from yielding when it strikes the block in the opposite head; but if excessive pressure is applied to the link, one or both blocks will rise upon their bearings, permitting the further inward motion of the link, which, if it is inserted in the lower mouth of the draw-head, or if a draw-head with a single mouth is used, will pass inward beneath the block.

In order to prevent the follower from being driven upon its inclined bearing against the top of the draw-head, or in contact with the under side of the platform-timbers, a stop or stops, K, may be arranged upon the bottom or side plates to limit the motion of the follower. When the stops are arranged at the sides a link thrust inward under excessive pressure may pass freely beneath the block.

I claim—

1. The combination, in a draw-head, of an inclined bearing, and a block or follower adapted thereto, and constructed and operating to fall by its gravity beneath the coupling-pin, bear upon the link, and maintain the same in a horizontal position after the pin drops, resist the thrust upon the link in coupling, and to rise on its bearing under excessive pressure upon the link, and permit the latter to pass beneath, all substantially as set forth.

2. A draw-head provided with an inclined bearing, and with a block or follower adapted thereto, whereby the block bears against and resists the thrust upon the link in coupling, but yields to excessive pressure, allowing the link to pass farther inward, as described.

In testimony whereof I have signed my name to this specification in the presence of two subscribing witnesses.

JACOB SINGER.

Witnesses:
LYMAN D. GILBERT,
EUGENE SNYDER.